United States Patent
Kavuri et al.

(10) Patent No.: US 7,454,569 B2
(45) Date of Patent: Nov. 18, 2008

(54) HIERARCHICAL SYSTEM AND METHOD FOR PERFORMING STORAGE OPERATIONS IN A COMPUTER NETWORK

(75) Inventors: Srinivas Kavuri, South Plainfield, NJ (US); Andre Duque Madeira, Laurence Harbor, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 362 days.

(21) Appl. No.: 10/877,831

(22) Filed: Jun. 25, 2004

(65) Prior Publication Data

US 2005/0033800 A1    Feb. 10, 2005

Related U.S. Application Data

(60) Provisional application No. 60/482,305, filed on Jun. 25, 2003.

(51) Int. Cl.
| | |
|---|---|
| *G06F 12/00* | (2006.01) |
| *G06F 13/00* | (2006.01) |
| *G06F 13/28* | (2006.01) |
| *G06F 7/00* | (2006.01) |
| *G06F 17/30* | (2006.01) |
| *G06F 15/16* | (2006.01) |
| *G06F 15/173* | (2006.01) |

(52) U.S. Cl. ............... 711/117; 711/161; 711/162; 707/203; 707/204; 707/205; 707/10; 709/201; 709/202; 709/203; 709/224; 709/226; 709/229; 709/252

(58) Field of Classification Search ......... 711/161–162, 711/117; 707/203–205, 10; 709/201–203, 709/224, 226, 229, 252
See application file for complete search history.

(56) References Cited

U.S. PATENT DOCUMENTS

| | | | |
|---|---|---|---|
| 4,686,620 | A |   | 8/1987 | Ng |
| 4,995,035 | A |   | 2/1991 | Cole et al. |
| 5,005,122 | A | * | 4/1991 | Griffin et al. ............... 709/203 |
| 5,093,912 | A |   | 3/1992 | Dong et al. |
| 5,133,065 | A |   | 7/1992 | Cheffetz et al. |

(Continued)

FOREIGN PATENT DOCUMENTS

EP        0 259 912        3/1988

(Continued)

OTHER PUBLICATIONS

Armstead et al., "Implementation of a Campus-wide Distributed Mass Storage Service: The Dream vs. Reality," *IEEE*, 1995, pp. 190-199.

(Continued)

*Primary Examiner*—Sanjiv Shah
*Assistant Examiner*—Yaima Campos
(74) *Attorney, Agent, or Firm*—Knobbe, Martens, Olson & Bear, LLP

(57) ABSTRACT

A system for performing storage operations using hierarchically configured storage operation cells, the system comprising: a first storage manager component; and a first storage operation cell, the first storage operation cell having a second storage manager component directed to performing storage operations in the first storage operation cell; wherein the first storage manager component is programmed to instruct the second storage manager regarding performance of storage operations in the first storage operation cell.

28 Claims, 2 Drawing Sheets

U.S. PATENT DOCUMENTS

| | | | |
|---|---|---|---|
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,321,816 A | 6/1994 | Rogan et al. | |
| 5,333,315 A | 7/1994 | Saether et al. | |
| 5,347,653 A | 9/1994 | Flynn et al. | |
| 5,410,700 A | 4/1995 | Fecteau et al. | |
| 5,448,724 A | 9/1995 | Hayashi | |
| 5,491,810 A | 2/1996 | Allen | |
| 5,495,607 A | 2/1996 | Pisello et al. | |
| 5,504,873 A | 4/1996 | Martin et al. | |
| 5,544,345 A | 8/1996 | Carpenter et al. | |
| 5,544,347 A | 8/1996 | Yanai et al. | |
| 5,559,957 A | 9/1996 | Balk | |
| 5,619,644 A | 4/1997 | Crockett et al. | |
| 5,638,509 A | 6/1997 | Dunphy et al. | |
| 5,673,381 A | 9/1997 | Huai et al. | |
| 5,699,361 A | 12/1997 | Ding et al. | |
| 5,729,743 A | 3/1998 | Squibb | |
| 5,751,997 A | 5/1998 | Kullick et al. | |
| 5,758,359 A | 5/1998 | Saxon | |
| 5,761,677 A | 6/1998 | Senator et al. | |
| 5,764,972 A | 6/1998 | Crouse et al. | |
| 5,778,395 A | 7/1998 | Whiting et al. | |
| 5,812,398 A | 9/1998 | Nielsen | |
| 5,813,009 A | 9/1998 | Johnson et al. | |
| 5,813,017 A | 9/1998 | Morris | |
| 5,875,478 A | 2/1999 | Blumenau | |
| 5,887,134 A | 3/1999 | Ebrahim | |
| 5,901,327 A | 5/1999 | Ofek | |
| 5,924,102 A | 7/1999 | Perks | |
| 5,933,601 A * | 8/1999 | Fanshier et al. | 709/223 |
| 5,950,205 A | 9/1999 | Aviani, Jr. | |
| 5,974,563 A | 10/1999 | Beeler, Jr. | |
| 6,021,415 A | 2/2000 | Cannon et al. | |
| 6,026,414 A | 2/2000 | Anglin | |
| 6,052,735 A | 4/2000 | Ulrich et al. | |
| 6,076,148 A | 6/2000 | Kedem | |
| 6,094,416 A * | 7/2000 | Ying | 370/222 |
| 6,131,095 A | 10/2000 | Low et al. | |
| 6,131,190 A | 10/2000 | Sidwell | |
| 6,148,377 A * | 11/2000 | Carter et al. | 711/147 |
| 6,148,412 A | 11/2000 | Cannon et al. | |
| 6,154,787 A | 11/2000 | Urevig et al. | |
| 6,161,111 A | 12/2000 | Mutalik et al. | |
| 6,167,402 A | 12/2000 | Yeager | |
| 6,212,512 B1 | 4/2001 | Barney et al. | |
| 6,260,069 B1 | 7/2001 | Anglin | |
| 6,269,431 B1 | 7/2001 | Dunham | |
| 6,275,953 B1 | 8/2001 | Vahalia et al. | |
| 6,301,592 B1 | 10/2001 | Aoyama et al. | |
| 6,324,581 B1 | 11/2001 | Xu et al. | |
| 6,328,766 B1 | 12/2001 | Long | |
| 6,330,570 B1 | 12/2001 | Crighton | |
| 6,330,642 B1 | 12/2001 | Carteau | |
| 6,343,324 B1 | 1/2002 | Hubis et al. | |
| RE37,601 E | 3/2002 | Eastridge et al. | |
| 6,356,801 B1 | 3/2002 | Goodman et al. | |
| 6,389,432 B1 | 5/2002 | Pothapragada et al. | |
| 6,397,308 B1 * | 5/2002 | Ofek et al. | 711/162 |
| 6,421,711 B1 | 7/2002 | Blumenau et al. | |
| 6,487,561 B1 | 11/2002 | Ofek et al. | |
| 6,519,679 B2 | 2/2003 | Devireddy et al. | |
| 6,538,669 B1 | 3/2003 | Lagueux, Jr. et al. | |
| 6,564,228 B1 | 5/2003 | O'Connor | |
| 6,742,092 B1 * | 5/2004 | Huebsch et al. | 711/162 |
| 6,886,020 B1 * | 4/2005 | Zahavi et al. | 707/204 |
| 2001/0029510 A1 * | 10/2001 | Tokui | 707/200 |
| 2002/0004883 A1 | 1/2002 | Nguyen et al. | |
| 2004/0205206 A1 * | 10/2004 | Naik et al. | 709/230 |

FOREIGN PATENT DOCUMENTS

| | | |
|---|---|---|
| EP | 0 405 926 | 1/1991 |
| EP | 0 467 546 | 1/1992 |
| EP | 0 774 715 | 5/1997 |
| EP | 0 809 184 | 11/1997 |
| EP | 0 899 662 | 3/1999 |
| EP | 0 981 090 | 2/2000 |
| WO | 95/13580 | 5/1995 |
| WO | 99/12098 | 3/1999 |

OTHER PUBLICATIONS

Arneson, "Mass Storage Archiving in Network Environments," *IEEE*, 1998, pp. 45-50.

Cabrera et al., "ADSM: A Multi-Platform, Scalable, Backup and Archive Mass Storage System," *Digest of Papers of the Computer Society Conference, IEEE* Comp. Soc. Press, vol. Conf. (Mar. 5, 1995), pp. 420-427.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Rosenblum et al., "The Design and Implementation of a Log-Structure File System," *Operating Systems Review SIGOPS*, vol. 25, No. 5, New York, US, pp. 1-15 (May 1991).

Jason Gait, "The Optical File Cabinet: A Random-Access File System For Write-Once Optical Disks," *IEEE Computer*, vol. 21, No. 6, pp. 11-22 (1988) (see in particular figure 5 in p. 15 and the recitation in claim 5).

* cited by examiner

HIERARCHICAL SYSTEM AND METHOD FOR PERFORMING STORAGE OPERATIONS IN A COMPUTER NETWORK

RELATED APPLICATIONS

This application claims priority to Provisional Application Ser. No. 60/482,305 titled HIERARCHICAL SYSTEM AND METHOD FOR PERFORMING STORAGE OPERATIONS IN A COMPUTER NETWORK, filed Jun. 25, 2003, which is hereby incorporated herein by reference in its entirety.

This application is also related to the following patents and pending applications, each of which is hereby incorporated herein by reference in its entirety:

Application Ser. No. 09/354,058, titled HIERARCHICAL BACKUP AND RETRIEVAL SYSTEM, filed Jul. 15, 1999;

U.S. Pat. No. 6,418,478, titled PIPELINED HIGH SPEED DATA TRANSFER MECHANISM, issued Jul. 9, 2002;

Application Ser. No. 09/610,738, titled MODULAR BACKUP AND RETRIEVAL SYSTEM USED IN CONJUNCTION WITH A STORAGE AREA NETWORK, filed Jul. 6, 2000;

Application Ser. No. 09/744,268, titled LOGICAL VIEW AND ACCESS TO PHYSICAL STORAGE IN MODULAR DATA AND STORAGE MANAGEMENT SYSTEM, filed Jan. 30, 2001;

Application Ser. No. 09/774,301, titled LOGICAL VIEW AND ACCESS TO DATA MANAGE BY A MODULAR DATA AND STORAGE MANAGEMENT SYSTEM, filed Jan. 30, 2001;

Application Ser. No. 60/409,183, titled DYNAMIC STORAGE DEVICE POOLING IN A COMPUTER SYSTEM, filed Sep. 9, 2002;

Application Ser. No. 10/262,556, titled METHOD FOR MANAGING SNAPSHOTS GENERATED BY AN OPERATING SYSTEM OR OTHER APPLICATION, filed Sep. 30, 2002;

Application Ser. No. 60/416,717, titled SYSTEM AND METHOD FOR MOUNTING QUICK RECOVERY VOLUMES, filed Oct. 7, 2002; and Application Ser. No. 60/460,234, SYSTEM AND METHOD FOR PERFORMING STORAGE OPERATIONS IN A COMPUTER NETWORK, filed Apr. 3, 2003.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND OF THE INVENTION

The invention disclosed herein relates generally to performing storage operations on electronic data in a computer network. More particularly, the present invention relates to integrating storage-related operations for a computer network according to a specified hierarchy of storage operation cells.

Current storage management systems employ a number of different methods perform storage operations on electronic data. For example, data can be stored as a primary copy, as a snapshot copy, as a backup copy, a hierarchical storage management copy ("HSM"), as an archive copy, and as other types of copies.

A primary copy of data generally comprises the production copy or other "live" version of the data used by a software application and in the native format of that application. A snapshot copy generally comprises a copy of the primary copy data at a certain point in time and is usually stored on a magnetic media storage device or other readily accessible storage device.

A backup copy is a point-in-time copy of the primary copy data stored in a backup format as opposed to in native application format. For example, a backup copy may be stored in a backup format that is optimized for compression and efficient long-term storage.

An HSM copy is a copy of the primary copy data, but generally comprises only a subset of the primary copy data that meets a certain criteria and is usually stored in a format other than the native application format. For example, an HSM copy might comprise only that data from the primary copy is larger than a given size threshold or older than a given age threshold and that is stored in a backup format. Often, HSM data is removed from the primary copy, but a stub is stored in the primary copy to indicate where to locate the data. When a user requests access to the HSM data that has been removed or migrated, systems use the stub to locate the data and make recovery of the data appear transparent even though the HSM data may be stored at a location different from the remaining primary copy data.

An archive copy is generally similar to an HSM copy, however, the data satisfying the criteria for removal from the primary copy is generally completely removed and no stub is left in the primary copy to indicate the location where the data has been moved. Archive copies of data are generally stored in a backup format or other non-native application format.

Examples of various types of data and copies of data are further described in the above-referenced related applications which are hereby incorporated by reference in their entirety. One example of a system that performs storage operations on electronic data that produce such copies of data is the Galaxy storage management system by CommVault Systems of Oceanport, N.J.

The Galaxy system leverages a modular storage management architecture that includes, among other things, storage manager components, client or data agent components, and media agent components as further described in Application Ser. No. 60/460,234 which is hereby incorporated herein by reference in its entirety. The Galaxy system also can be hierarchically configured into backup cells to store and retrieve backup copies of electronic data as further described in application Ser. No. 09/354,058 which is hereby incorporated by reference in its entirety.

While the Galaxy system offers a number of advantages over other systems, backup cells are still only hierarchically configured to perform backups of data and not directed to performing other types of storage operations. There is thus a need for systems and methods to hierarchically configure backup cells to perform other types of storage operations including snapshot copies, HSM copies, archive copies, and other types of copies of electronic data.

SUMMARY OF THE INVENTION

The present invention addresses, among other things, the problems discussed above performing storage operations on electronic data in a computer network.

In accordance with some aspects of the present invention, a computerized system is provided for performing storage operations using hierarchically configured storage operation cells, the system comprising: a first storage manager component; and a first storage operation cell, the first storage operation cell having a second storage manager component directed to performing storage operations in the first storage operation cell; wherein the first storage manager component is programmed to instruct the second storage manager regarding performance of storage operations in the first storage operation cell.

In some embodiments, the first storage manager component comprises a master storage manager component. The first storage manager component may comprise a component of a storage operation cell other than the first storage operation cell or alternatively may not comprise a component of a storage operation cell.

In some embodiments, the first storage manager component controls the second storage manager component during performance of storage operations in the first storage operation cell. The first storage operation cell may include a media agent component and a data agent component and in some embodiments, the first storage manager component is programmed to directly control at least one of the media agent and the data agent component during performance of storage operations in the first storage operation cell. The first storage manager component may also bypass the second storage manager component to directly control at least one of the media agent or the data agent component during performance of storage operations in the first storage operation cell.

In some embodiments of the invention, the first storage manager component instructs the second storage manager component regarding a time to perform a storage operation or a type of storage operation to perform, such as a snapshot copy operation, an HSM copy operation, or an archive copy operation.

In some embodiments, the first storage operation cell is organized according to a functional criteria, such as a type of storage operation performed by the first storage operation cell. In other embodiments, the first storage operation cell is organized according to a geographic criteria, such as a physical location of one or more components of the first storage operation cell.

In some embodiments, the second storage manager component is programmed to communicate status information regarding the first storage operation cell to the first storage manager component. Exemplary status information includes information regarding the availability of a component of the first storage operation cell, information regarding resource usage status by the first storage operation cell, such as usage of a storage device associated with the first storage operation cell, usage of a network pathway by components associated with the first storage operation cell, information regarding the status of one or more storage operations previously performed by the first storage operation cell, such as the status of one or more storage operations scheduled to be performed by the first storage operation cell, and other types of status information.

In some embodiments, the system comprises a second storage operation cell, the second storage operation cell having a third storage manager component directed to performing storage operations in the second storage operation cell, wherein the first storage manager component is programmed to instruct the third storage manager regarding performance of storage operations in the second storage operation cell. In some embodiments, the second storage manager component is also programmed to instruct the third storage manager regarding performance of storage operations in the second storage operation cell. In some embodiments, the second storage manager component is programmed to communicate status information regarding the first storage operation cell to the first storage manager component and the third storage manager component is programmed to communicate status information regarding the second storage operation cell to the first storage manager component. The first storage manager component is programmed to present a report of summary information regarding the status information communicated by the first storage operation cell and the status information communicated by the second storage operation cell.

In some embodiments, the second storage manager component is programmed to instruct the third storage manager regarding performance of storage operations in the second storage operation cell if a user of the second storage manager satisfies an access criteria for access to the second storage operation cell.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION

Figure 1:
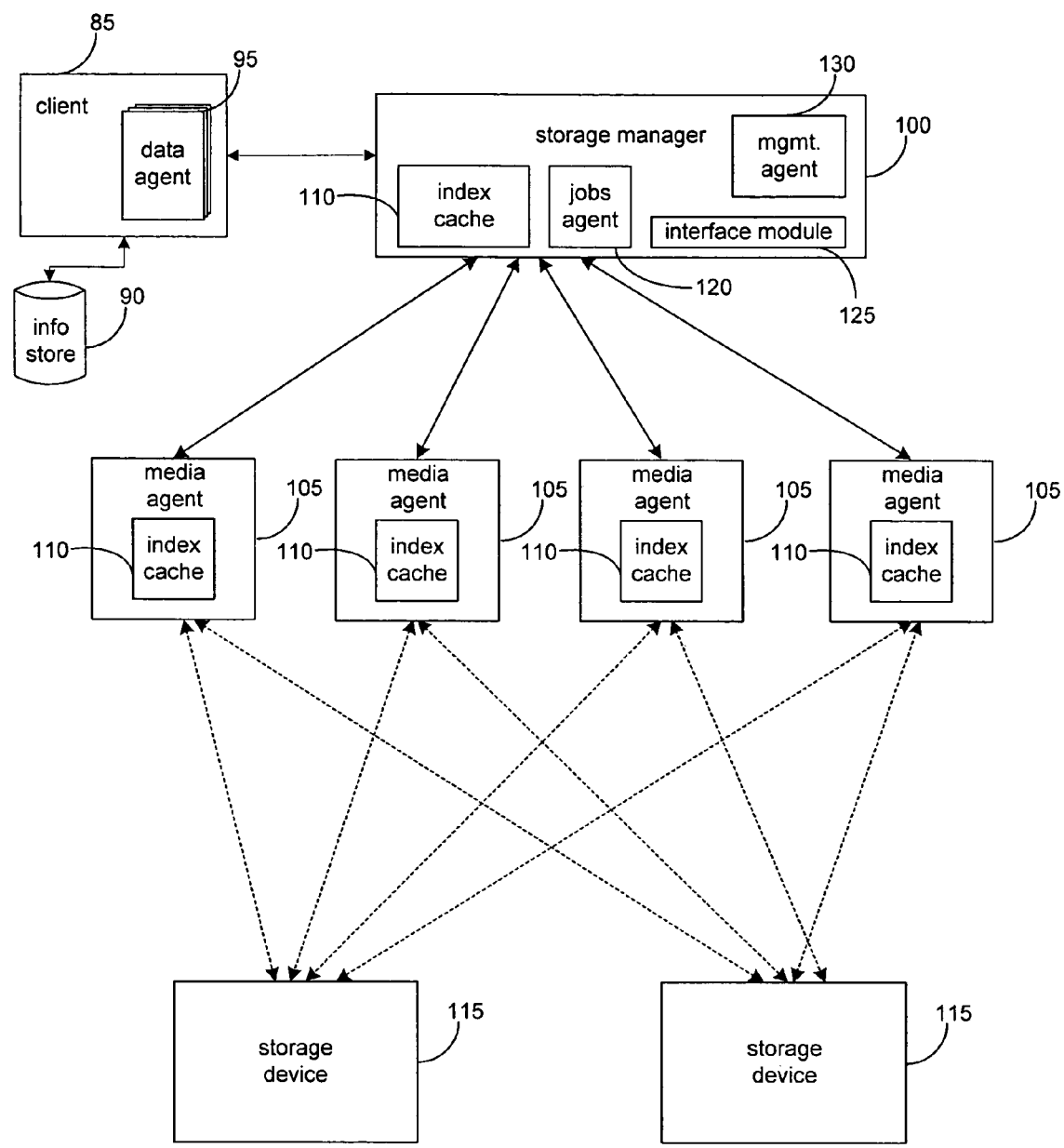
FIG. 1 is a block diagram of a storage operation cell in a system to perform storage operations on electronic data in a computer network according to an embodiment of the invention.
Figure 2:
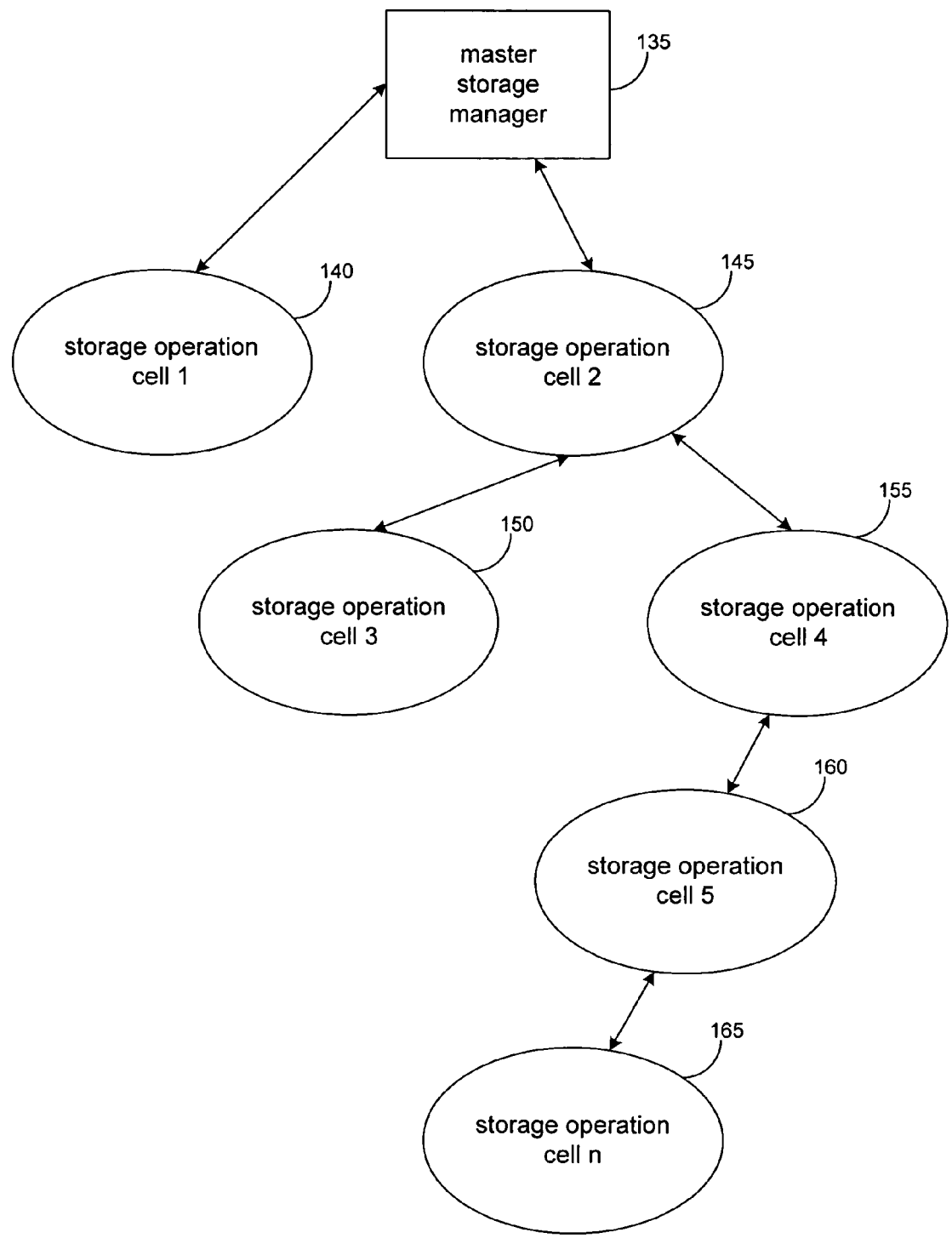
FIG. 2 is a block diagram of a hierarchically organized group of storage operation cells in a system to perform storage operations on electronic data in a computer network according to an embodiment of the invention.

With reference to FIGS. 1 through 2, embodiments of the invention are presented. FIG. 1 presents a block diagram of a storage operation cell in a system to perform storage operations on electronic data in a computer network according to an embodiment of the invention. As shown, the storage operation cell includes a storage manager 100 and one or more of the following: a client 85, an information store 90, a data agent 95, a media agent 105, an index cache 110, a storage device 115, a jobs agent 120, an interface module 125, and a management agent 130. The system and elements thereof are exemplary of a modular backup system such as the CommVault Galaxy backup system, available from CommVault Systems, Inc. of Oceanport, N.J., and further described in application Ser. No. 09/610,738 which is incorporated herein by reference in its entirety.

A storage operation cell generally includes combinations of hardware and software components directed to performing storage operations on electronic data. Exemplary storage operation cells according to embodiments of the invention include CommCells as embodied in the QNet storage management system and the QiNetix storage management system by CommVault Systems of Oceanport, N.J. Storage operation cells generally include a storage manager 100, a data agent 95, a media agent 105, a storage device 115, and, according to some embodiments, other components as further described herein. According to some embodiments of the invention, storage operations cells are related to backup cells and provide all of the functionality of backup cells as further described in application Ser. No. 09/354,058, however, storage operation cells also perform additional types of storage operations and provide other types of storage management functionality which are not generally offered by backup cells. According to embodiments of the invention, additional storage operations performed by storage operation cells include creation, storage, retrieval, and migration of primary copies, snapshot copies, backup copies, HSM copies, archive copies, and other types of copies of electronic data. In some embodiments, storage operation cells also provide an integrated management console for users or system processes to interface with to perform storage operations on electronic data as further described herein.

A data agent 95 is generally a software module that is generally responsible for archiving, migrating, and recovering data of a client computer 85 stored in an information store 90 or other memory location. Each client computer 85 has at least one data agent 95 and the system can support many client computers 85. The system provides a plurality of data agents 95 each of which is intended to backup, migrate, and recover data associated with a different application. For example, different individual data agents 95 may be designed to handle Microsoft Exchange data, Lotus Notes data, Microsoft Windows 2000 file system data, Microsoft Active Directory Objects data, and other types of data known in the art.

If a client computer 85 has two or more types of data, one data agent 95 is generally required for each data type to archive, migrate, and restore the client computer 85 data. For example, to backup, migrate, and restore all of the data on a Microsoft Exchange 2000 server, the client computer 85 would use one Microsoft Exchange 2000 Mailbox data agent 95 to backup the Exchange 2000 mailboxes, one Microsoft Exchange 2000 Database data agent 95 to backup the Exchange 2000 databases, one Microsoft Exchange 2000 Public Folder data agent 95 to backup the Exchange 2000 Public Folders, and one Microsoft Windows 2000 File System data agent 95 to backup the client computer's 85 file system. These data agents 95 would be treated as four separate data agents 95 by the system even though they reside on the same client computer 85.

The storage manager 100 is generally a software module or application that coordinates and controls storage operations performed by the storage operation cell. The storage manager 100 communicates with all elements of the storage operation cell including client computers 85, data agents 95, media agents 105, and storage devices 115, to initiate and manage system backups, migrations, and recoveries. The storage manager 100 also communicates with other storage operation cells as further described herein.

The storage manager 100 includes a jobs agent 120 software module which monitors the status of all storage operations that have been performed, that are being performed, or that are scheduled to be performed by the storage operation cell. The jobs agent 120 is communicatively coupled with an interface agent 125 software module. The interface agent 125 provides presentation logic, such as a graphical user interface ("GUI"), an application program interface ("API"), or other interface by which users and system processes can retrieve information about the status of storage operations and issue instructions to the storage operations cell regarding performance of those storage operations as further described herein. For example, a user might modify the schedule of a number of pending snapshot copies or other types of copies. As another example, a user might use the GUI to view the status of all storage operation currently pending in all storage operation cells or the status of a particular components in a storage operation cell.

The storage manager 100 also includes a management agent 130 software module. The management agent 130 generally provides an interface with other management components 100 in other storage operations cells through which information and instructions regarding storage operations may be conveyed. For example, in some embodiments as further described herein, a management agent 130 in first storage operation cell can communicate with a management agent 130 in a second storage operation cell regarding the status of storage operations in the second storage operation cell. In some embodiments, a management agent 130 in first storage operation cell can communicate with a management agent 130 in a second storage operation cell to control the storage manager 100 (and other components) of the second storage operation cell via the management agent 130 contained in the storage manager 100 for the second storage operation cell. In other embodiments, the management agent 130 in the first storage operation cell communicates directly with and controls the components in the second storage management cell and bypasses the storage manager 100 in the second storage management cell. Storage operation cells can thus be organized hierarchically as further described herein.

A media agent 105 is generally a software module that conducts data, as directed by the storage manager 100, between the client computer 85 and one or more storage devices 115 such as a tape library, a magnetic media storage device, an optical media storage device, or other storage device. The media agent 105 is communicatively coupled with and controls the storage device 1115. For example, the media agent 105 might instruct the storage device 115 to use a robotic arm or other means to load or eject a media cartridge, and to archive, migrate, or restore application specific data. The media agent 105 generally communicates with the storage device 115 via a local bus such as a SCSI adaptor. In some embodiments, the storage device 115 is communicatively coupled to the data agent 105 via a Storage Area Network ("SAN").

Each media agent 105 maintain an index cache 110 which stores index data the system generates during backup, migration, and restore storage operations as further described herein. For example, storage operations for Microsoft Exchange data generate index data. Index data provides the system with an efficient mechanism for locating user files for recovery operations. This index data is generally stored with the data backed up to the storage device 115, and the media agent 105 that controls the storage operation also writes an additional copy of the index data to its index cache 110. The data in the media agent 105 index cache 110 is thus readily available to the system for use in storage operations and other activities without having to be first retrieved from the storage device 115.

The storage manager 100 also maintains an index cache 110. Index data is also used to indicate logical associations between components of the system, user preferences, management tasks, and other useful data. For example, the storage manager 100 might use its index cache 110 to track logical associations between media agents 105 and storage devices 115.

Index caches 110 typically reside on their corresponding storage component's hard disk or other fixed storage device. Like any cache, the index cache 110 has finite capacity and the amount of index data that can be maintained directly corresponds to the size of that portion of the disk that is allocated to the index cache 110. In one embodiment, the system manages the index cache 110 on a least recently used ("LRU") basis as known in the art. When the capacity of the index cache 110 is reached, the system overwrites those files in the index cache 110 that have been least recently accessed with the new index data. In some embodiments, before data in the index cache 110 is overwritten, the data is copied to an index cache 110 copy in a storage device 115. If a recovery operation requires data that is no longer stored in the index cache 110, such as in the case of a cache miss, the system recovers the index data from the index cache 110 copy stored in the storage device 115.

In some embodiments, components of the system may reside and execute on the same computer. In some embodiments, a client computer 85 component such as a data agent 95, a media agent 105, or a storage manager 100 coordinates and directs local archiving, migration, and retrieval application functions as further described in application Ser. No. 09/610,738. This client computer 85 component can function independently or together with other similar client computer 85 components.

FIG. 2 presents a block diagram of a hierarchically organized group of storage operation cells in a system to perform storage operations on electronic data in a computer network according to an embodiment of the invention. As shown, the system includes a master storage manager component 135, a first storage operation cell 140, a second storage operation cell 145, a third storage operation cell 150, a fourth storage operation cell 155, a fifth storage operation cell 160, and an nth storage operation cell 165.

As previously described, storage operation cells are often communicatively coupled and hierarchically organized. For example, as shown in FIG. 2, a master storage manager 135 is associated with, communicates with, and directs storage operations for a first storage operation cell 140, a second storage operation cell 145, a third storage operation cell 150, a fourth storage operation cell 155, a fifth storage operation cell 160, and an nth storage operation cell 165. In some embodiments, the master storage manager 135 is not part of any particular storage operation cell. In other embodiments (not shown), the master storage manager 135 may itself be part of a storage operation cell.

Thus, the master storage manager 135 communicates with the manager agent of the storage manager of the first storage operation cell 140 (or directly with the other components of the first cell 140) regarding storage operations performed in the first storage operation cell 140. For example, in some embodiments, the master storage manager 135 instructs the first storage operation cell 140 how and when to perform storage operations including the type of operation to perform and the data on which to perform the operation.

In other embodiments, the master storage manager 135 tracks the status of its associated storage operation cells, such as the status of jobs, system components, system resources, and other items, by communicating with manager agents (or other components) in the respective storage operation cells. In other embodiments, the master storage manager 135 tracks the status of its associated storage operation cells by receiving periodic status updates from the manager agents (or other components) in the respective cells regarding jobs, system components, system resources, and other items. For example, in some embodiments, the master storage manager 135 uses methods monitor network resources such as mapping network pathways and topologies to, among other things, physically monitor storage operations and suggest alternate routes for storing data as further described herein.

In some embodiments, the master storage manager 135 stores status information and other information regarding its associated storage operation cells and the system in an index cache or other data structure accessible to the master storage manager 135. In some embodiments, as further described herein, the presentation interface of the master storage manager 135 accesses this information to present users and system processes with information regarding the status of storage operations, storage operation cells, system components, and other information of the system.

Storage operation cells may thus be organized hierarchically. Thus, storage operation cells may inherit properties from their parents or be controlled by other storage operation cells in the hierarchy. Thus, in some embodiments as shown in FIG. 2, the second storage operation cell 145 controls or is otherwise superior to the third storage operation cell 150, the fourth storage operation cell 155, the fifth storage operation cell 160, and the nth storage operation cell 165. Similarly, the fourth storage operation cell 155 controls the fifth storage operation cell 160, and the nth storage operation cell 165.

Storage operation cells may also be organized hierarchically according to criteria such as function, geography, architectural considerations, or other factors useful in performing storage operations. For example, in one embodiment storage operation cells are organized according to types of storage operations: the first storage operation cell 140 is directed to performing snapshot copies of primary copy data, and the second storage operation cell 145 is directed to performing backup copies of primary copy data or other data. For example, in another embodiment, the first storage operation cell 140 represents a geographic segment of an enterprise, such as a Chicago office, and a second storage operation cell 145 represents a different geographic segment, such as a New York office. In this example, the second storage operation cell 145, the third storage operation cell 150, the fourth storage operation cell 155, the fifth storage operation cell 160, and the nth storage operation cell 165 could represent departments within the New York office. Alternatively, these storage operation cells could be further divided by function performing various types of copies for the New York office or load balancing storage operations for the New York office.

In some embodiments, hierarchical organization of storage operation cells facilitates, among other things, system security and other considerations. For example, in some embodiments, only authorized users are allowed to access or control certain storage operation cells. For example, a network administrator for an enterprise might have access to all storage operation cells including the master storage manager 135. But a network administrator for only the New York office, according to a previous example, might only satisfy access criteria to have access to the second storage operation cell 145, the third storage operation cell 150, the fourth storage operation cell 155, the fifth storage operation cell 160, and the nth storage operation cell 165 which comprise the New York office storage management system.

In some embodiments, hierarchical organization of storage operation cells facilitates storage management planning and decision-making. For example, in some embodiments, a user of the master storage manager 135 can view the status of all jobs in the associated storage operation cells of the system as well as the status of each component in every storage operation cell of the system. The user can then plan and make decisions based on this global data. For example, the user can view high-level report of summary information regarding storage operations for the entire system, such as job completion status, component availability status, resource usage status (such as network pathways, etc.), and other information. The user can also drill down through menus or use other means to obtain more detailed information regarding a particular storage operation cell or group of storage operation cells.

In other embodiments, the master storage manager 135 alerts the user when a particular resource is unavailable or congested. A storage device might be full or require additional media. Alternatively, a storage manager in a particular storage operation cell may be unavailable due to hardware failure, software problems, or other reasons. In some embodiments, the master storage manager 135 (or another storage manager within the hierarchy of storage operation cells) utilizes the global data regarding its associated storage operation cells at its disposal to suggest solutions to such problems when they occur or even before they occur. For example, the master storage manager 135 might alert the user that a storage device in a particular storage operation cell was full or otherwise congested, and then suggest, based on job and data storage information contained in its index cache, an alternate storage device.

As another example, in some embodiments the master storage manager 135 (or other network storage manager) contains programming directed to analyzing the storage patterns and resources of its associated storage operation cells and which suggests optimal or alternate methods of performing storage operations. Thus, for example, the master storage manager 135 might analyze traffic patterns to determine that snapshot data should be sent via a different network segment or to a different storage operation cell or storage device. In some embodiments, users can direct specific queries to the master storage manager 135 regarding predicting storage operations or regarding storage operation information.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A system that performs storage operations using hierarchically organized storage operation cells, the system comprising:
   a first storage manager component in communication with a manager index;
   a first storage operation cell comprising:
      a first media module that conducts first data between a client component and at least one storage device,
      a first index comprising information indicating the location of the first data on the at least one storage device,
      a second storage manager component directing storage operations performed by the first storage operation cell wherein the second storage manager directs the performance of a first storage operation of first data in response to instructions received from the first storage manager component, and
      wherein the first storage operation cell communicates at least a portion of the information in the first index to the manager index; and
   a second storage operation cell hierarchically coupled to the first storage operation cell, the second storage operation cell comprising:
      a second media module that conducts second data between a client component and the at least one storage device,
      a second index indicating the location of the second data on the at least one storage device, and
      a third storage manager component directing storage operations performed by the second storage operation cell wherein the third storage manager directs the performance of a second storage operation of second data in response to instructions received from the second storage manager component,
      wherein the second storage operation is different than the first storage operation, and
      wherein the second storage operation cell communicates at least a portion of the information in the second index to the manager index,
   wherein the first storage manager component instructs the second storage manager component regarding performance of storage operations in the first storage operation cell, wherein the second storage manager component instructs the third storage manager component regarding performance of storage operations in the second storage operation cell,
   wherein the first storage manager component maintains the manager index comprising the information received from the first and second indexes, wherein the manager index further comprises information about hierarchical associations between the first storage operation cell and the second storage operation cell, and
   wherein the first storage manager component instructs alternate storage operations in the first and second storage operation cells based on the manager index.

2. The system of claim 1, wherein the first storage manager component comprises a component of a storage operation cell other than the first storage operation cell.

3. The system of claim 1, wherein the first storage manager component does not comprise a component of a storage operation cell.

4. The system of claim 1, wherein the first storage operation cell further comprises a first data agent component obtaining application-specific data from the client component.

5. The system of claim 4, wherein the first storage manager component directly controls at least one of the first media module and the first data agent component during performance of storage operations in the first storage operation cell.

6. The system of claim 5, wherein the first storage manager component bypasses the second storage manager component to directly control at least one of the first media module or the first data agent component during performance of storage operations in the first storage operation cell.

7. The system of claim 1, wherein the first storage manager component instructs the second storage manager component regarding a time to perform a storage operation.

8. The system of claim 1, wherein the first storage manager component instructs the second storage manager component regarding a type of storage operation to perform.

9. The system of claim 1, wherein the first storage operation cell is organized according to a functional criteria.

10. The system of claim 9, wherein the functional criteria comprises a type of storage operation performed by the first storage operation cell.

11. The system of claim 1, wherein the first storage operation cell is organized according to a geographic criteria.

12. The system of claim 11, wherein the geographic criteria comprises a physical location of one or more components of the first storage operation cell.

13. The system of claim 1, wherein the second storage manager component communicates status information regarding the first storage operation cell to the first storage manager component.

14. The system of claim 13, wherein the status information comprises information regarding the availability of a component of the first storage operation cell.

15. The system of claim 1, wherein the first storage manager component instructs the third storage manager component regarding performance of storage operations in the second storage operation cell.

16. The system of claim 15, wherein the second storage manager component communicates status information regarding the first storage operation cell to the first storage manager component and the third storage manager component communicates status information regarding the second storage operation cell to the first storage manager component.

17. The system of claim 16, wherein the first storage manager component presents a report of summary information regarding the status information communicated by the first storage operation cell and the status information communicated by the second storage operation cell.

18. The system of claim 15, wherein the second storage manager component instructs the third storage manager component regarding performance of storage operations in the second storage operation cell if a user of the second storage manager component satisfies an access criteria for access to the second storage operation cell.

19. The system of claim 1, wherein the first storage manager component uses the manager index to track logical associations between the first and second media modules and the at least one storage device.

20. The system of claim 1, wherein the first data is associated with a first application and the second data is associated with a second application different from the first application.

21. The system of claim 1, wherein the first storage operation cell comprises a plurality data agent components, wherein each data agent component obtains data from different applications of the client component.

22. The system of claim 1, wherein the second storage manager component instructs the third storage manager component based at least in part on information stored in the first index.

23. The system of claim 1, further comprising a third storage operation cell comprising:
   a third media module that conducts third data between the client component and the at least one storage device,
   a third index indicating the location of the third data on the at least one storage device, and
   a fourth storage manager component directing storage operations performed by the third storage operation cell.

24. The system of claim 23, wherein the third storage operation cell is hierarchically coupled to the second storage operation cell, and wherein the third storage manager component instructs the fourth storage manager component regarding performance of storage operations by the third storage operation cell.

25. The system of claim 23, wherein the third storage operation cell is hierarchically coupled to the first storage operation cell, and wherein the second storage manager component instructs the fourth storage manager component regarding performance of storage operations by the third storage operation cell.

26. The system of claim 1, wherein the first storage operation cell further comprises a plurality of media modules including the first media module, and wherein the second storage manager component uses the first index to select at least one of the plurality of media modules to perform at least one storage operation.

27. The system of claim 1, wherein the first index is maintained by the first media module.

28. The system of claim 1, wherein the at least one storage device comprises a first storage device and a second storage device, and wherein the first storage operation cell comprises the first storage device and the second storage operation cell comprises the second storage device.

* * * * *